Patented Jan. 28, 1930

1,744,881

UNITED STATES PATENT OFFICE

WILLIAM C. GEER, OF NEW ROCHELLE, NEW YORK, ASSIGNOR TO THE B. F. GOODRICH COMPANY, OF NEW YORK, N. Y., A CORPORATION OF NEW YORK

PAINT AND METHOD OF MAKING THE SAME

No Drawing. Application filed June 6, 1927. Serial No. 197,012.

This invention relates to protective coatings for bodies and articles of various materials and particularly to compositions of matter suitable for use as surface coatings, paints or varnishes, especially adapted for the protection of surfaces of metallic articles, and to a method of manufacturing such compositions of matter.

Considerable difficulty has been experienced in the industrial arts in providing protective coatings or paints for metallic structures which will not peel off or crack under hard usage, and which will withstand moisture, salts, acids and alkalies. Further, the paints and lacquers commonly employed for covering metals are generally sufficiently pervious to moisture to permit corrosion to creep under the coating and gradually to loosen the coating from the metal especially wherever a small initial crack or break in the coating develops from any cause.

The purpose of the present invention is to provide a composition of matter suitable for a protective coating for metals which shall adhere firmly to the metallic surface, which shall not break under flexure or bending of the metal, or under alternate expansion and contraction of metal under the influence of heat and cold, which shall have high durability under exposure to sunlight and to moisture, as well as high impermeability to vapors and to solutions of acids, alkalies and salts, and which shall not be friable even at extremely low temperatures.

I have found that paints having the remarkable characteristics hereinabove indicated may be prepared by admixing with certain artificial rubber isomers, hereinafter more fully described, fillers, or ingredients which give to the artificial rubber isomers higher flow or spreading characteristics, and increased covering properties. Increased flow or spreading properties may be imparted by adding to the rubber isomer such materials as linseed oil, Perilla oil, cottonseed oil, tung oil, mineral rubber, paraffin, and the like, and where opaque or colored coatings are desired I may add any one or more of the common paint pigments, such as barytes, lithopone, zinc oxide, iron oxide, organic dyes, and similar paint pigments now commonly employed. For convenience in description, these ingredients, including both the flowing agents and pigments, are designated herein as "fillers."

It is also generally desirable to add to the paint composition certain preservatives or antioxidants, such as condensation products of aldehydes with nitrogenous bases, and other similarly acting products, in order to give to the paints of this application a greater durability, particularly when exposed to sunlight.

The artificial rubber isomer employed in my improved paint composition may be made by any of the numerous methods which have been employed for the production of artificial rubber isomers, the preparation of this constituent of my paint compound forming no part of the present invention. For the purpose of illustration, the paint of the present invention is described as embodying a tough, non-friable, heat-plastic rubber isomer having a less chemical unsaturation than rubber, a specific gravity of approximately 0.97 to 1.00 and a softening temperature (tensile method) of from 55° to 105° C. This product may be made by admixing with 100 parts by weight of rubber approximately 7½ parts by weight of phenol sulfonic acid, and heating the admixed mass, as for example, in an oven for six hours at 140° C. The rubber isomers hereinabove referred to are dispersible in liquid vehicles generally, but are particularly readily dispersible in the so-called organic solvents, such as gasoline, benzol, toluol, turpentine and the like, and the latter are consequently the liquid vehicles commonly employed for the paints of this application. Other liquid vehicles, however, may be employed and water paints may be made from these rubber isomers if desired.

*Example 1.*—As a specific example of a paint prepared in accordance with the present invention, I take 96 parts by weight of the tough rubber isomer hereinabove described and add thereto as antioxidants 3 parts of aldol alpha-naphthylamine and 1 part of benzidine, and as a filler 287 parts by weight of barytes. The ingredients after being thoroughly admixed upon a roll mill, or by means of any other suitable mixing apparatus, are dispersed in an organic solvent, such as toluol, gasoline, benzol, turpentine, or the like, by stirring in a paint mixer or other appropriate apparatus. The nature and amount of solvent employed varies to some extent with the desired consistency of the paint, but I find in general that approximately 14 ounces of the rubber isomer to one gallon of a quick drying organic solvent produces a paint suitable for most purposes.

In the above recipe, the pigment has been employed in the ratio of 70 volumes of pigment (barytes) to 100 volumes of the rubber isomer, but for many purposes I find that smaller amounts of pigments produce satisfactory results. The paint of the above example is particularly adapted for an under or priming coat on metallic surfaces, is non-absorbent and practically impermeable to vapors and to moisture, forms a flexible film which does not crack upon bending of the metal, and in general provides a superior protection of the metallic surface under adverse conditions.

*Example 2.*—Where it is desirable to provide a clear paint or varnish, I may employ instead of the opaque fillers of the above example, 10 parts, more or less, of transparent or translucent fillers such as drying oils, waxes, resins, mineral rubber and the like. A paint comprising the above described rubber isomer 96 parts by which, aldol alpha-naphthylamine 3 parts, benzidine one part, and linseed oil 10 parts, dispersed in an organic solvent, such as benzol, has been found to have very excellent properties as an outer or finish or gloss coat. Where greater body or color is desired, pigments may be added to the recipe of this example in amounts varying from 10 to 70 volumes of pigments to 100 volumes of the rubber isomer.

In the above examples, an artificial rubber isomer having tough, non-friable properties has been employed. I find, however, that rubber isomers which are brittle and grindable in their characteristics may also be employed. These grindable rubber isomers possess the same general chemical characteristics as the tough, non-friable isomers and may generally be formed by adding higher percentages of the isomerizing agents and/or by heating for longer times or at higher temperatures. It is therefore the purpose of the present invention to include the hard grindable rubber isomers as well as the tough non-friable products.

*Example 3.*—A high quality paint may be prepared from an admixture of the rubber isomers above referred to. Thus, 52 parts by weight of a tough non-friable rubber isomer, 46 parts by weight of a hard, grindable rubber isomer, 2 parts by weight of antioxidants, 100 parts by weight of zinc oxide, and 200 parts by weight of lithopone were thoroughly admixed and then dispersed in an organic solvent in the approximate proportion of 1 pound of the rubber isomer to 1 gallon of the solvent. This produced an ivory colored heavily pigmented paint of great covering power which adhered to metallic surfaces with unusual tenacity and which upon test afforded superior protection of the metal against corrosive vapors and liquids.

*Example 4.*—Baking paints, or paints which are hardened by subjection to heat, may also be prepared in a manner similar to that above described. Thus, an excellent baking paint is obtained by admixing the non-friable rubber isomer 96 parts by weight, antioxidants 4 parts by weight, fillers 10 parts by weight, to which is preferably added a drier, such as manganese linoleate, lead resinate, manganese resinate or cobalt acetate, and dispersing these ingredients in an organic solvent in the manner above described. When spread upon a metal surface by any suitable means and then baked in an oven, a hard, adherent protective film is formed. The time and temperature of the baking may be varied over a wide range and I have found that from $\frac{1}{2}$ hour to 10 hours at 220° F. to 320° F. produces a satisfactory film. Admixtures of the non-friable rubber isomer and the grindable rubber isomer may also be employed in the preparation of baking paints, and pigments may also be added to give to the baked paint desired color characteristics.

The superior qualities of the paints of this application have been amply demonstrated by a number of series of tests. In each series of these tests, a large number of the highest grade paints, varnishes and lacquers offered for sale on the market and the paints of this application have been subjected to the identical conditions and comparative data thus obtained.

In one test, commercial oil paints and lacquers, and the paints herein described, were applied to aluminum and to magnesium castings and the surface coatings after thorough drying were subjected to the action of a salt spray. The castings which were coated with the oil paints and lacquers were corroded badly in 8 hours, while the castings coated with the paints of the present application were intact and apparently unaffected at the end of 96 hours. The paints of this application display the same remarkable resistance to the action of salt spray when employed as a coating for ferrous metals, and the further remarkable property that where the metal is exposed, the corrosion does not work back under the coating from the exposed surface, but is confined to the surface of the exposed metal.

The tests with acids and alkalies are also unique in that commercial paints and lacquers quickly fail under conditions which do not affect the paints of this application. For instance, the films stand up without material deterioration when immersed in concentrated sulfuric acid, concentrated hydrochloric acid or a 40 per cent solution of caustic soda. A film of the paint of this application on metal first immersed for several minutes in a boiling six per cent caustic soda solution and then transferred to a boiling solution of sulfuric acid was not apparently affected by this treatment. No commercial paint, varnish or lacquer was able to stand up under this test.

The high impermeability of the paints of this application to vapors and gases has been demonstrated both in the laboratory test and in practice. A hard-rubber vulcanizer in which steam at high temperatures and pressures directly contacts with the rubber composition and takes up therefrom corrosive vapors was coated on the inside with the paint of this application and after months of service was apparently in as good condition as when first put on. Prior to this test, no coating material had been found which would stand up under this service and prevent the corrosion of the metal of the heater. This service test also demonstrates the ability of these paints to stand up without cracking under alternate expansion and contraction of the metal base to which they are applied, since the vulcanizer was alternately heated and cooled with each new change handled thereby.

The impermeability of these paint films to vapors and gases was demonstrated by painting a steel flue or chimney for the removal of hot combustion gases with a paint of the present application. After five months' exposure to the hot flue gases, the paint film was intact and the metal of the flue free of any corrosion.

Numerous other tests have been made which show the paints herein described to be superior in their adhesion to metals, in their flexibility and resistance to cracking, in their strength under impact, in their resistance to moisture absorption, as well as in the properties hereinabove more fully discussed.

It will be understood that the examples hereinabove given are by no means exhaustive but rather are selected for the purpose of illustration, and that the specific rubber isomers hereinabove described as constituents of the paints are also merely illustrative of types which may be employed. It has been deemed to be unnecessary for the purposes of this application to describe herein in detail all of the numerous methods which may be employed for the production of rubber isomers suitable for paint compositions. Suffice it to say here that isomerzing agents having the generic formula R—$SO_2$—X, wherein R represents an organic radical or a hydroxy group and X represents a hydroxy group or chlorine, have been practically employed in the production of rubber isomers.

Other isomerzing agents found to be practical include the halides of amphoteric metals, the hydrochlorides and the hydrobromides of weak bases, the di-alkyl sulfates, the metallic salts of organic sulphonates, and many others. The term "artificial isomer of rubber" as herein employed is intended to include all products, however prepared, the principal constituent of which has the same empirical formula as rubber, namely $(C_5H_8)_n$, a less chemical unsaturation than rubber, a specific gravity in the neighborhood of 0.97 to 1.00, and a softening temperature not substantially higher than 150° C.

It will be obvious that numerous variations and modifications in the recipes of the paints hereinabove described may be made without departing from the principles of this invention, the essentials of which are defined in the claims appended hereto.

I claim:

1. A spreadable composition comprising the dispersion in a relatively quick-drying liquid vehicle of an artificial isomer of rubber, said composition being capable of producing a dried film having a materially higher impermeability to metal-corrosive vapors and gases than have highest grade oil paints and rosin varnishes.

2. A protective coating composition consisting of the dispersion in a relatively quick-drying liquid vehicle of materials comprising an artificial isomer of rubber, a filler and a preserving agent, said composition being capable of producing a dried film having a materially higher impermeability to metal-corrosive vapors and gases than have highest grade oil paints and rosin varnishes.

3. A protective coating composition consisting of the dispersion in a relatively quick-drying liquid vehicle of materials comprising an artificial isomer of rubber and a flowing agent, said composition being capable of producing a dried film having a materially higher impermeability to metal-corrosive vapors and gases than have highest grade oil paints and rosin varnishes.

4. A protective coating composition consisting of the dispersion in a relatively quick-drying liquid vehicle of materials comprising an artificial isomer of rubber, and a pigment, said composition being capable of producing a dried film having a materially higher impermeability to metal-corrosive vapors and gases than have highest grade oil paints and rosin varnishes.

5. A protective coating composition consisting of the dispersion in a relatively quick-drying liquid vehicle of materials comprising an artificial isomer of rubber, a flowing agent, a pigment and a preserving agent, said composition being capable of producing a dried film having a materially higher impermeability to metal-corrosive vapors and gases than have highest grade oil paints and rosin varnishes.

6. A spreadable composition comprising the dispersion in a liquid vehicle of a tough, non-friable, solid artificial isomer of rubber, a filler, and a preserving agent.

7. A spreadable composition comprising the dispersion in a liquid vehicle of the product of the reaction under the influence of heat or rubber with an isomerizing agent of rubber, a filler, and a preserving agent.

8. A spreadable composition comprising the dispersion in a liquid vehicle of the product of the reaction under the influence of heat of rubber with a reagent having the general formula R—SO$_2$—X, a filler, and a preserving agent.

9. A spreadable composition comprising the dispersion in a liquid vehicle of the product of the reaction of rubber with a sulfonic acid, a filler, and a preserving agent.

10. A spreadable composition comprising the dispersion in a liquid vehicle of the product of the reaction of rubber with phenol sulfonic acid, a filler, and a preserving agent.

11. A spreadable composition comprising the dispersion in a quick-drying, organic solvent of an artificial isomer of rubber, a filler, and a preserving agent.

12. A spreadable composition comprising the dispersion in a quick-drying, organic solvent of an artificial isomer of rubber, a flowing agent, a pigment, and a preservative.

13. A spreadable composition comprising the dispersion in a quick-drying, organic solvent of a tough, non-friable, solid artificial isomer of rubber, a filler, and a preserving agent.

14. A spreadable composition comprising the dispersion in a quick-drying, organic solvent of the product of the reaction under the influence of heat of rubber with a reagent having the general formula R—SO$_2$—X, a filler, and a preserving agent.

15. A spreadable composition comprising the dispersion in a quick-drying, organic solvent of the product of the reaction of rubber with phenol sulfonic acid, a filler, and a preserving agent.

16. The method of preparing a spreadable composition comprising dispersing into a liquid vehicle by means of a mechanical trituration an artificial isomer of rubber, a filler and a preservative.

17. The method of preparing a spreadable composition comprising dispersing into a liquid vehicle by means of mechanical trituration an artificial rubber isomer, a pigment, a flowing agent and a preservative.

18. The method of preparing a spreadable composition comprising intimately admixing an artificial isomer of rubber, a filler and a preservative, and dispersing said admixture in a liquid vehicle.

19. The method of preparing a spreadable composition comprising intimately admixing an artificial isomer of rubber, a filler and a preservative, and dispersing said admixture in a quick-drying organic solvent.

20. A protective coating composition consisting of the dispersion in a relatively quick-drying liquid vehicle of materials comprising an artificial isomer of rubber, a filler, and a preserving agent, said composition being capable of producing a dried film having a materially higher impermeability to metal-corrosive vapors and gases than have highest grade paints comprising rubber.

In witness whereof I have hereunto set my hand this 2 day of May, 1927.

WILLIAM C. GEER.

CERTIFICATE OF CORRECTION.

Patent No. 1,744,881.                                   Granted January 28, 1930, to

WILLIAM C. GEER.

It is hereby certified that error appears in the printed specification of the above numbered patent requiring correction as follows: Page 2, line 32, for the word "which" read "weight"; same page, line 102, for the misspelled word "varinshes" read "varnishes"; page 4, line 10, claim 7, for the word "or" read "of"; and that the said Letters Patent should be read with these corrections therein that the same may conform to the record of the case in the Patent Office.

Signed and sealed this 1st day of April, A. D. 1930.

(Seal)                                                            M. J. Moore,
                                                                      Acting Commissioner of Patents.